United States Patent
Zhu et al.

(10) Patent No.: US 10,990,556 B2
(45) Date of Patent: Apr. 27, 2021

(54) PROGRAMMABLE LOGIC DEVICE WITH ON-CHIP USER NON-VOLATILE MEMORY

(71) Applicant: Gowin Semiconductor Corporation, Ltd., GuangZhou (CN)

(72) Inventors: Jinghui Zhu, San Jose, CA (US); San-Ta Kow, San Jose, CA (US)

(73) Assignee: GOWIN Semiconductor Corporation, Ltd., GuangZhou (CN)

( * ) Notice: Subject to any disclaimer, the term of this patent is extended or adjusted under 35 U.S.C. 154(b) by 0 days.

(21) Appl. No.: 14/831,204

(22) Filed: Aug. 20, 2015

(65) Prior Publication Data
US 2016/0274816 A1    Sep. 22, 2016

(30) Foreign Application Priority Data
Mar. 17, 2015    (CN) .......................... 201510117909.X

(51) Int. Cl.
| | |
|---|---|
| *G06F 13/40* | (2006.01) |
| *G06F 13/10* | (2006.01) |
| *G06F 13/16* | (2006.01) |
| *G06F 9/445* | (2018.01) |
| *G06F 15/78* | (2006.01) |
| *G06F 9/4401* | (2018.01) |

(52) U.S. Cl.
CPC ........ *G06F 13/4068* (2013.01); *G06F 9/4401* (2013.01); *G06F 9/44505* (2013.01); *G06F 13/102* (2013.01); *G06F 13/1668* (2013.01); *G06F 15/7871* (2013.01)

(58) Field of Classification Search
CPC ................................................ H03K 19/17736
See application file for complete search history.

(56) References Cited

U.S. PATENT DOCUMENTS

| | | | |
|---|---|---|---|
| 7,190,190 B1 | 3/2007 | Camarota et al. | |
| 7,683,660 B1* | 3/2010 | Bakker | ............... G06F 17/5054 |
| | | | 326/38 |

(Continued)

OTHER PUBLICATIONS

Microsemi, IGLOO2 Product Brief, Oct. 2013.*
AMBA 3 AHB-Lite Protocol v1.0, 2006.*

*Primary Examiner* — Ryan Bertram
*Assistant Examiner* — Edmund H Kwong
(74) *Attorney, Agent, or Firm* — James M. Wu; JW Law Group

(57) ABSTRACT

The present invention discloses a programmable logic device with on-chip user non-volatile memory, comprising: a programmable logic array, which is a user programmable logic array and comprises a SRAM array and a logic block array with an interface; the SRAM array is used to store configuration data to control the logic block array in real time, therefore, the logic block can be formed to perform the function a user desires; a non-volatile memory block, comprising one or more segments storing configuration data and one or more segments storing user data which is used during FPGA's normal operation after configuration; the non-volatile memory block has only one interface, and the non-volatile memory block connects to a programming controller through the interface; a programming controller, which can randomly access the non-volatile memory through a data bus, an address bus, and corresponding control signals.

20 Claims, 7 Drawing Sheets

(56) References Cited

U.S. PATENT DOCUMENTS

| | | | |
|---|---|---|---|
| 2008/0028187 A1* | 1/2008 | Casselman | G06F 13/409 |
| | | | 712/37 |
| 2013/0104004 A1* | 4/2013 | Maeda | G06F 13/1642 |
| | | | 714/773 |
| 2015/0254477 A1* | 9/2015 | Matsumoto | G06F 21/602 |
| | | | 713/193 |

* cited by examiner

PROGRAMMABLE LOGIC DEVICE WITH ON-CHIP USER NON-VOLATILE MEMORY

CROSS-REFERENCE TO RELATED APPLICATIONS

The present application claims priority from Chinese Patent Application No. 201510117909.X filed Mar. 17, 2015, the disclosure of which is hereby incorporated herein by reference.

TECHNICAL FIELD

The present invention relates to the field of integrated circuits, more particularly to a non-volatile programmable logic device with on-chip user non-volatile memory.

BACKGROUND

After half of a century of development of integrated circuits, programmable logic devices applied in the field of integrated circuits have become ubiquitous, and computers, cellphones and other digital appliances become an indispensable part of the modern society structure. This is because modern computing, communication, manufacturing and transportation systems, including the Internet, all rely on the existence of integrated circuits. Over the years, integrated circuits constantly develop towards smaller external dimensions, so that each chip may encapsulate more circuits. Thus, the capacity per unit area is increased, and cost may be reduced, and functions may be added (see Moore's law), the number of transistors in the integrated circuits has doubled every one year and a half. In short, almost all indices improve as the external dimensions decrease, including that unit cost and switch power dissipation are decreased and speed is increased.

There are a plurality of classification methods of integrated circuits, and they may be classified in accordance with functions into Memory, CPU, Application Specific Integrated Circuits (ASICs) and Programmable Logic Device (PLD). Programmable logic device (PLD) may be further classified into SPLD (Simple PLD), CPLD (Complex PLD), and FPGA (Field Programmable Gate Array). Nowadays, FPGA has become the mainstream, and the programmable logic device may be replaced with FPGA thereafter.

A FPGA chip is an integrated circuit which may be configured with desired configuration data after powered on, and it is an IC which may change its function as desired, rather than a fixed circuit; its function may change along with the configuration data.

FPGA may be classified into volatile FPGA and non-volatile FPGA in accordance with the characteristics of storing programming data. The volatile FPGA usually employs a SRAM memory to store configuration data stream files. After powered on, the device is generally programmed by an external CPU, or loaded with configuration data stream files from an external non-volatile memory automatically. However, the non-volatile FPGA may enter into the working state immediately after powered on, since the configuration data stream files are kept in its own memory.

There are mainly two methods of implementing the non-volatile FPGA: one is to control a logic circuit directly using a non-volatile memory. Now, all the SPLDs, CPLDs and part of the non-volatile FPGAs utilize such way.

The other is, the non-volatile FPGA still controls a logic circuit directly using a SRAM, while a non-volatile memory is also on the chip. When the device is powered on, the configuration data stream file will be loaded into the SRAM from the non-volatile memory automatically. Just to point out, there is an alternative method to achieve the same goal, which encapsulates a volatile FPGA device and a non-volatile memory device in one package. It looks like a non-volatile FPGA from the outside. However, it is much slower than a single chip non-volatile FPGA in terms of power-on speed.

U.S. Pat. No. 7,190,190 B1 discloses "PROGRAMMBLE LOGIC DEVICE WITH ON-CHIP NONVOLATILE USER MEMORY", and one may see FIGS. 1,2 to know the technical contents disclosed by the patent. In FIG. 1, main innovations of the patent are shown; a programmable logic device comprises a user-defined programmable logic portion (602) and a non-volatile memory portion (606). The non-volatile memory portion comprises a part storing programmable logic data and a part storing user data. User data may be read and written by the user's programmable logic portion. The implementation of the function is based on two interfaces of the non-volatile memory array, one of which may connect to the part of programmable logic data, and the other of which may connect to the part of user data.

In FIG. 2, ways of performing reading and writing operations on the memory comprising the part of user data by a user are shown. The points are: a shift register controls an address (824) and a data register (828), respectively; data is written and read line by line; and former operations of on-chip non-volatile memory are traditionally by way of a shift register, the reading and writing of data by way of the shift register is line by line, in which "address jumping back and forth" cannot be achieved easily.

SUMMARY OF THE INVENTION

In order to overcome the deficiency of prior art, the present invention proposes a programmable logic device with on-chip user non-volatile memory, which is easy to use, low-cost and flexible to implement.

In order to achieve the above goals, technical solutions of the present invention are:

a programmable logic device with on-chip user non-volatile memory, comprising:
 a programmable logic array, which is a user programmable logic array, comprising a SRAM array and a user logic block array with interface; the SRAM array is used to store configuration data to control the logic block array in real time, therefore, the logic block can be formed to perform the function a user desires;
 a non-volatile memory block, comprising one or more segments storing configuration data and one or more segments storing user data which is used during FPGA's normal operation after configuration; the non-volatile memory block has only one interface, and the non-volatile memory block connects to a programming controller through the interface;
 a programming controller, which can randomly access the non-volatile memory through a data bus, an address bus, and corresponding control signals; this programming controller can also form an interface between the user programmable logic block and the non-volatile memory block to enable user logic to directly access the non-volatile memory block in the same random manner.

The programmable logic device comprises a user-defined programmable logic portion and an on-chip non-volatile memory portion. The non-volatile memory has a solo interface which connects to a special programming controller. The whole non-volatile memory may be accessed through the interface. The non-volatile memory block comprises one or more segments of storing programmable logic data and one or more segments of storing user data; the arrangement of these segments in the block can be flexible; user data may be read or written by the user's programmable logic portion.

The entire non-volatile memory can be read and written through a data bus and an address bus and corresponding control signals by the programming controller. The programming controller can form an interface between the user programmable logic and the memory to help the user logic to randomly access the user data in the memory block.

In comparison with prior art, the present invention has the following benefits:

1) Due to the ability to random access the user data in the non-volatile memory quickly, user application is substantially broaden. For example, the user now are not limited to only store parameter type of data, which does not have the frequently accessing requirement. They can store data like computational data, or even program code itself which often need to be executed in a flexible order.

2) The way of accessing the entire on-chip non-volatile memory with a solo interface simplifies the design substantially, and reduces the cost of both development and production effectively.

3) The flexible arrangement of the user data segments and the configuration data segments in the non-volatile memory block creates a lot of opportunities for global layout placement optimization. Therefore, the areas of chips may be saved, and production cost may be reduced.

DETAILED DESCRIPTION OF THE INVENTION

The present invention is described in greater details below in conjunction with the figures, however, embodiments of the present invention are not limited by the description.

Figure 1:
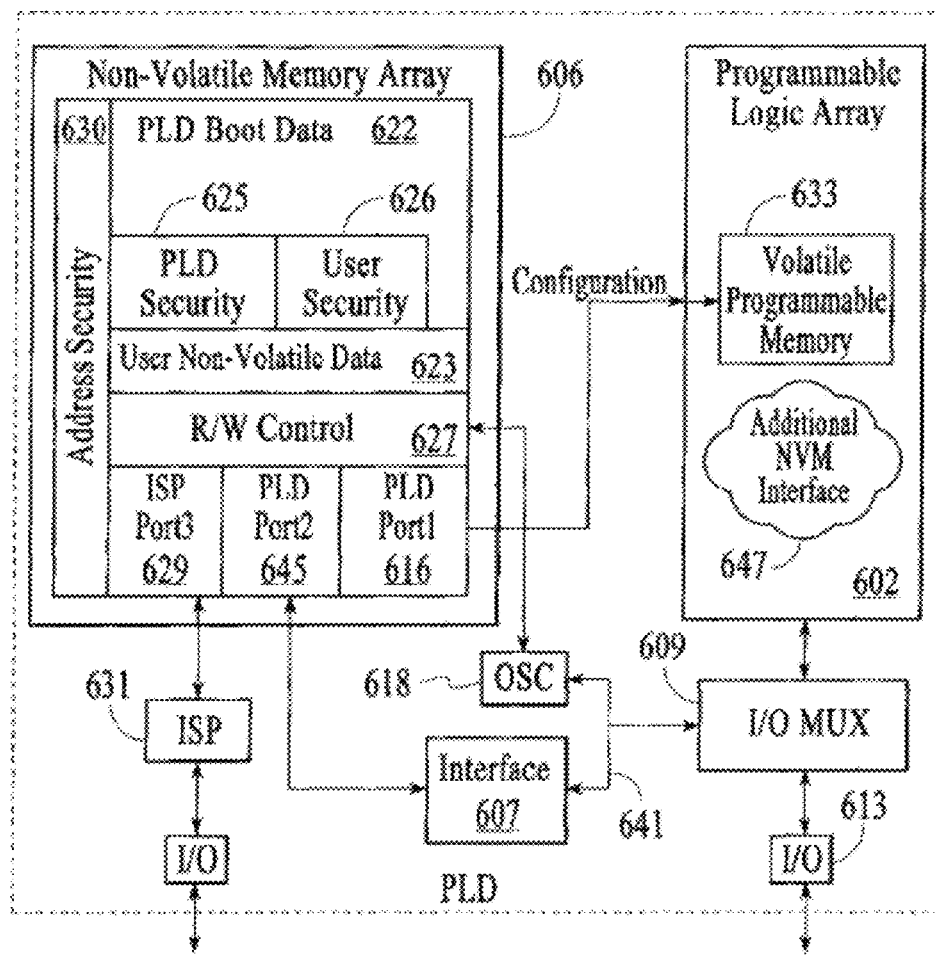
FIGS. 1, 2 are structural schematic diagrams of prior art.
Figure 2:
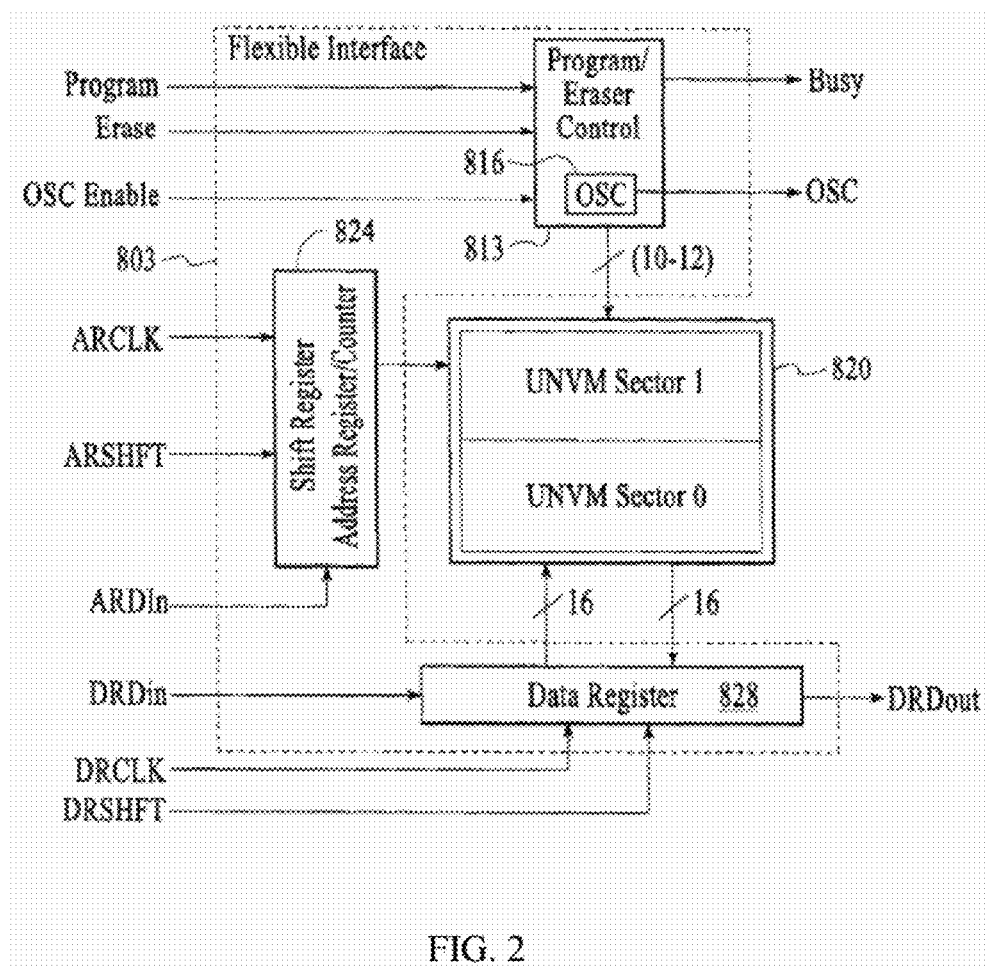
Figure 3:
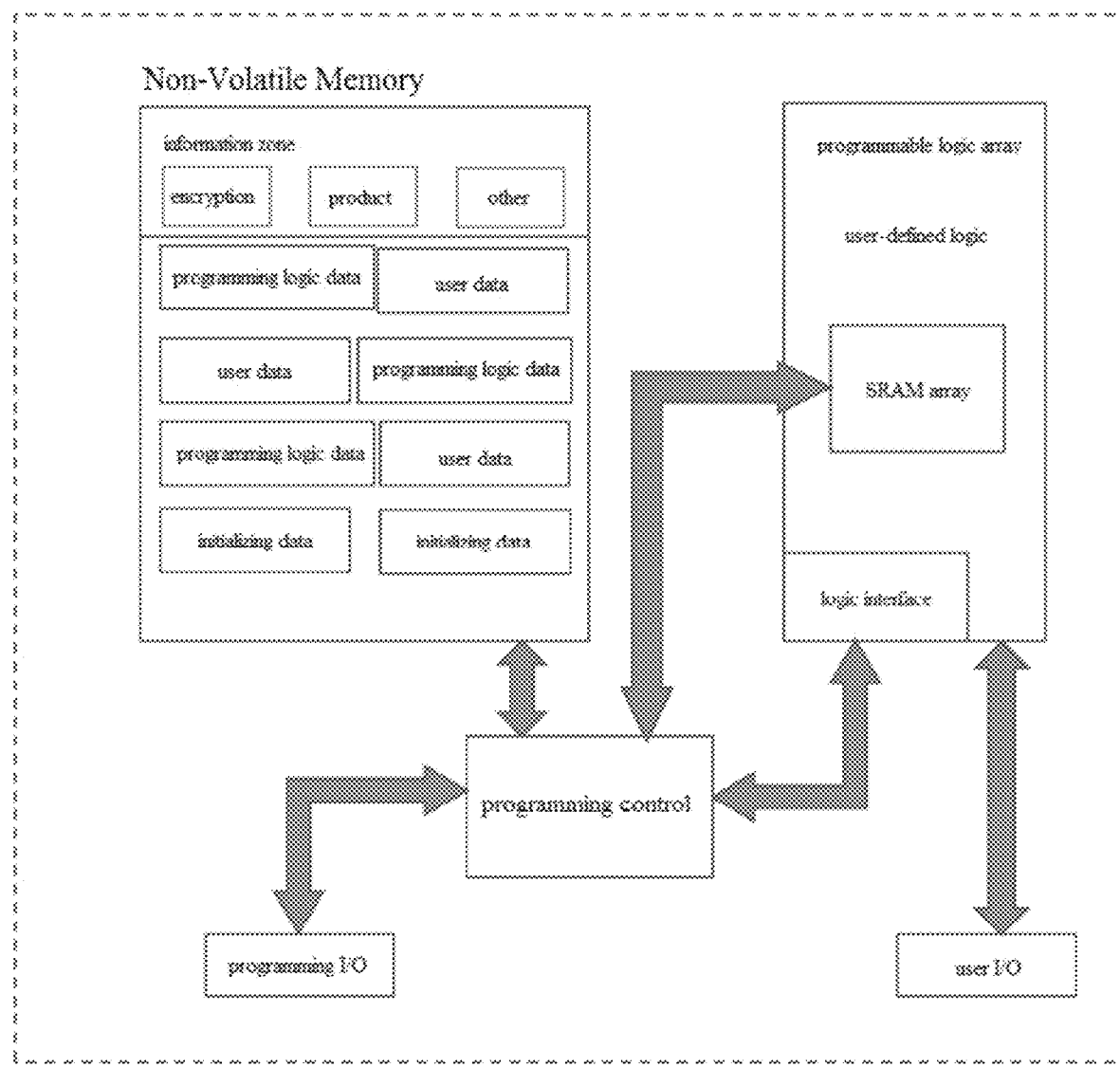
FIG. 3 is an overall architecture diagram of the present invention.

As shown in FIG. 3, a programmable logic device with on-chip user non-volatile memory, comprising:

a programmable logic array, which is a user programmable logic array, comprising a SRAM array and a logic block with an interface; the SRAM array is used to store configuration data to control the logic block array in real time, therefore, the logic block can be formed to the function user desired;

a non-volatile memory block, comprising one or more segments storing configuration data and one or more segments storing user data which is used during FPGA's normal operation after configuration; the non-volatile memory block has only one interface, and the non-volatile memory block connects to a programming controller through the interface;

a programming controller, which can randomly access the non-volatile memory through a data bus, an address bus, and corresponding control signals; this programming controller can also form an interface between the user programmable logic block and the non-volatile memory block to enable user logic to directly access the non-volatile memory block in the same random manner.

User data in the non-volatile memory may be initialized to the SRAM array automatically when powered on.

In the present embodiment, the non-volatile memory is but not limited by $E^2PROM$, flash memory, FRAM or one-time programmable (OTP) memory.

FIG. 3 shows that the programmable device comprises a user-defined programmable logic portion and a non-volatile memory portion. The non-volatile memory portion has a solo interface which connects to a special programming controller. The non-volatile memory block, comprising one or more segments storing configuration data and one or more segments storing user data. The arrangement of the segments is completely flexible. User data may be read and written by the user's programmable logic portion.

The SRAM array is used to store configuration data and control the programmable logic array in real time, thus, the logic block can be formed to perform the function a user desires.

The programming controller could perform the following functions:

1) receiving external configuration data,
2) performing write operations while programming the non-volatile memory,
3) performing write operations while programming the SRAM array,
4) transferring the configuration data from the non-volatile memory to the SRAM array after the programmable logic device is powered on,
5) initializing the user's embedded SRAM block with the user data in the non-volatile memory after the programmable logic device is powered on,
6) accessing the user data from the non-volatile memory by the user logic through the solo interface.

In the present embodiment, the solo interface in the programmable logic array employs a wide range of standard protocols, such as JTAG, SPI, $I^2C$ or CPU.

Figure 4:
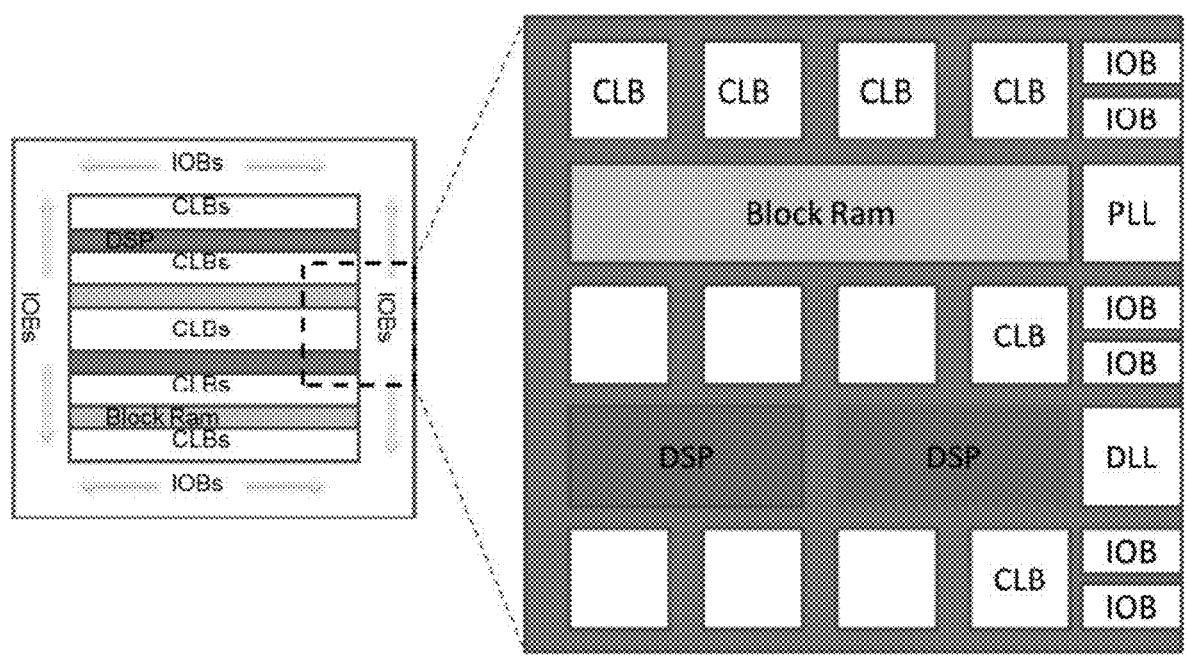
FIG. 4 is an architecture diagram of a typical FPGA logic array.

FIG. 4 shows a programmable logic array of a typical FPGA programmable device. The logic of each module and the logic of connections between respective modules are all controlled by the SRAM array.

Figure 5:
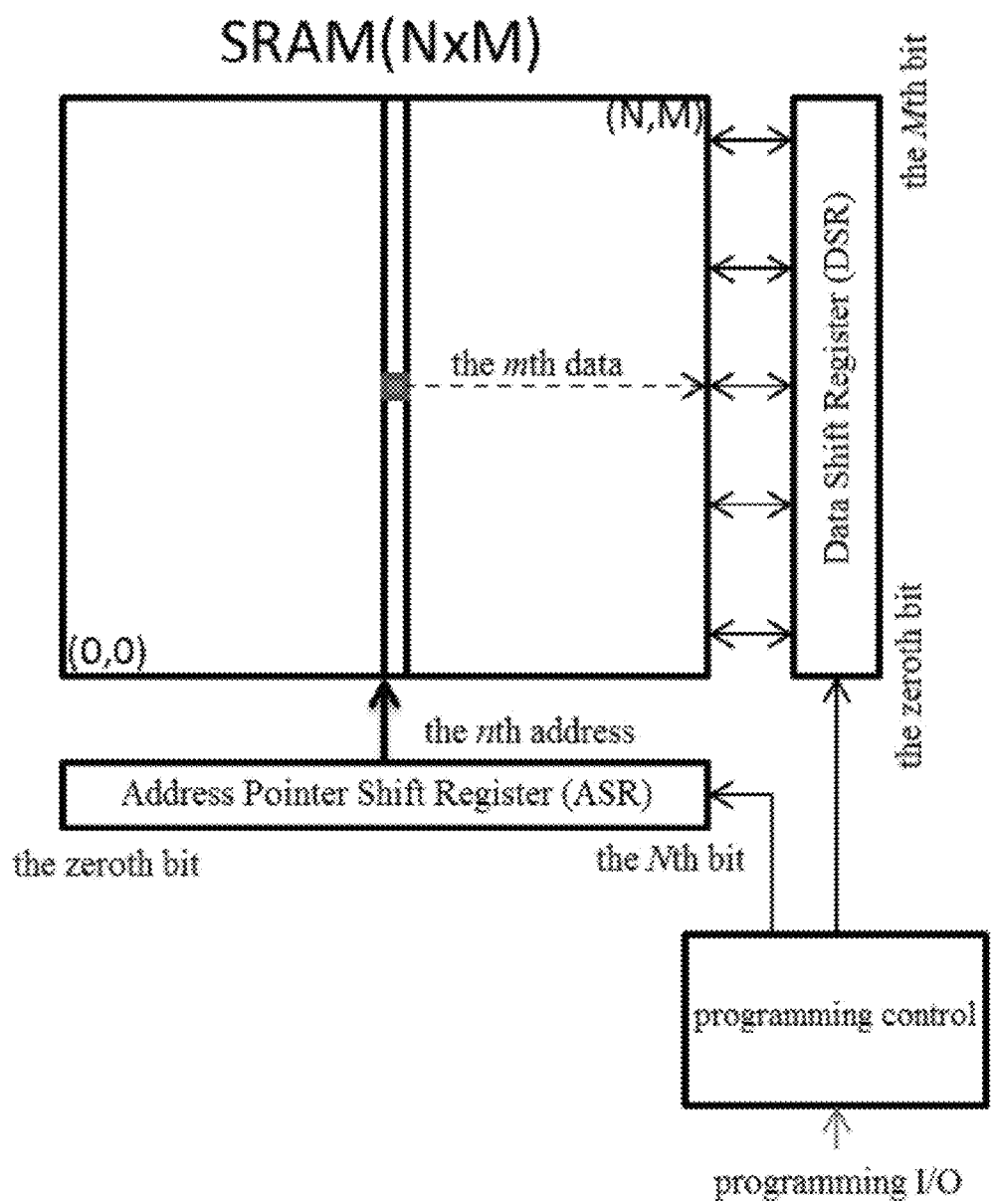
FIG. 5 is an architecture diagram of a typical FPGA logic array.
Figure 6:
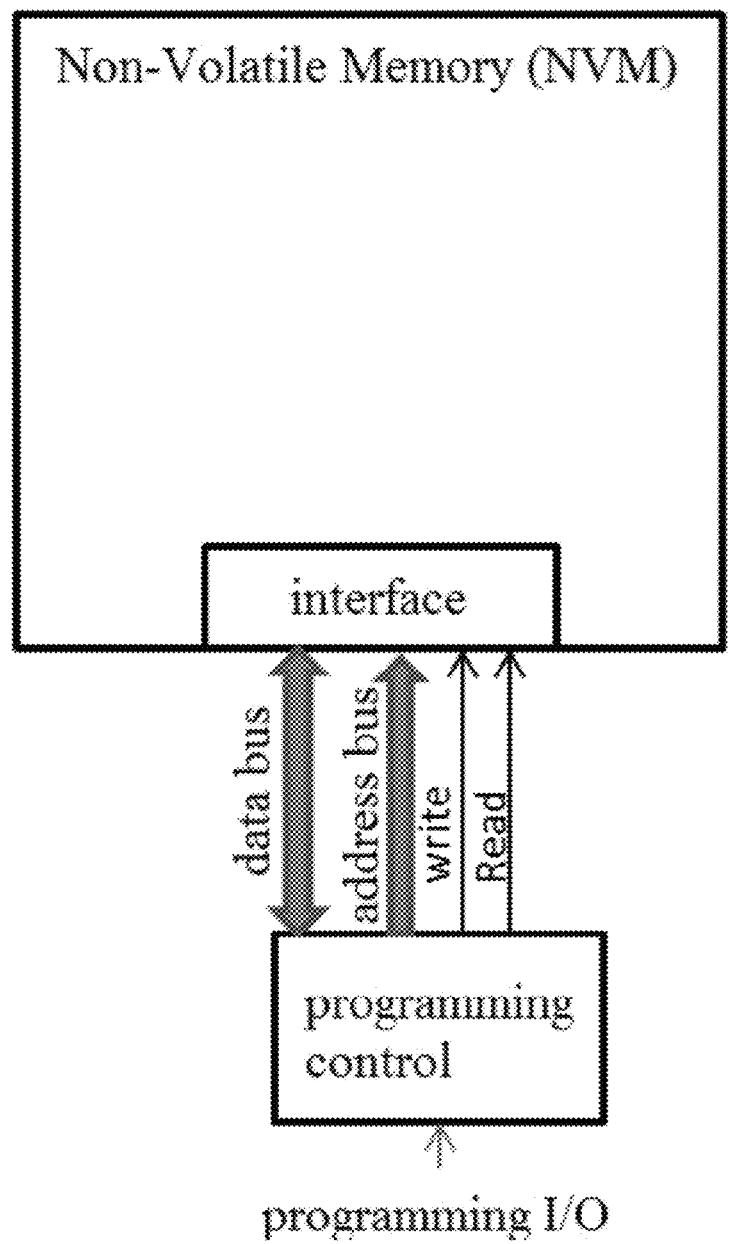
FIG. 6 is a schematic diagram of the interface of a non-volatile memory.

FIG. 5 shows that the programming controller reads and writes the SRAM array by way of a shift register. The detailed operations are as follows:

1. The initial values of all address pointer shift registers (ASR) are "0"
2. Shift "1" into the zeroth bit of the ASR. Other bits are all "0". Therefore, the SRAM cells in the zeroth line are all selected. (Here each cell is one bit.)
3. Shift data into the whole data shift register (DSR)
4. Write the selected SRAM cells with data in the DSR, and thus the SRAM cells in the zeroth line are set values.
5. Shift the data "1" in the ASR to the first bit, and other bits are all "0" except that the first bit is "1". Therefore, the SRAM cells in the first line are selected.
6. Repeat the above steps 3, 4, 5 till the final line
7. End FIG. 6 shows how to read and write the entire non-volatile memory through a solo interface by the programming controller. The interface that is connecting the programming controller and the non-volatile memory is a common random access memory interface. The width of a data bus is generally 8, 16, 32, or 64 bits. The width of an address bus is concerned with the capacity of the non-volatile memory. The addressing range of an 8-bit address bus is up to $2^8=256$.

The detailed operations are as follows:

1. The address of a SRAM cell to be accessed is stored in an address register, such as the 127th cell (the cell here may be 8, 16, 32, or 64 bits, which is determined based on the width of the data bus)

2. The data of the address register is sent to a decoder of the memory by an address line. The 127th SRAM cell is selected by the decoder.

3. Data is sent by the data register and appears on the data bus.

4. Write the selected SRAM cell with the data on the data bus, and therefore the 127th SRAM cell is set a value.

5. End

In addition to the above asynchronous operation embodiments, a RAM (Random Access Memory) interface of a synchronous memory and a RAM interface of a double data rate (DDR) memory may also be applied. That is, the interface connecting the programming controller and the non-volatile memory could also be a RAM interface of a synchronous memory or a RAM interface of a DDR memory, in order to read and write the non-volatile memory.

Figure 7:
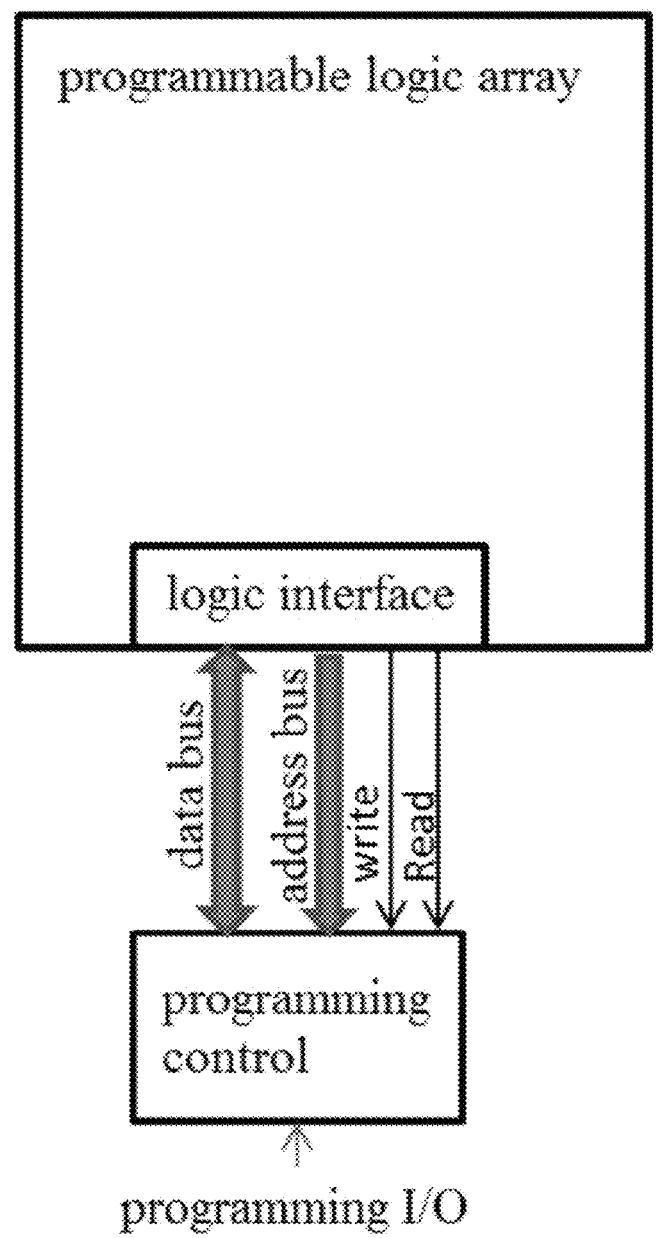
FIG. 7 is a schematic diagram of the interface between user logic and a programming control module.

FIG. 7 shows that the programming controller connects to the logic interface of the programmable logic array, and its characteristics is that the reading and writing operations on the non-volatile memory through the programming control module by a user is the same as the RAM operation. A RAM interface of an asynchronous memory, a RAM interface of a synchronous memory and a RAM interface of a double data rate (DDR) memory may be used as well.

The aforesaid embodiments of the present invention cannot be construed as limitations of the scope of protection of the present invention. Any modification, equivalence and improvement made within the spiritual principle of the present invention should be included within the scope of protection of the present invention.

What is claimed:

1. A programmable logic device (PLD) containing on-chip non-volatile memory capability, comprising:
a programmable logic array having an SRAM array which stores user data and configuration data;
a non-volatile memory (NVM) block fabricated adjacent to the programmable logic array on the PLD and organized to have an information zone and a data zone, wherein the information zone includes product information, wherein the data zone includes multiple segments for storing the configuration data and multiple segments for storing user data which is generated during normal operation after configuration, the NVM block having a one interface configured to handle data, address, and control signals for NVM access; and
a programming controller (PC) fabricated adjacent to the NVM block on the PLD and coupling to the NVM block via the one interface, wherein the PC is configured to facilitate communication between the programmable logic array and the NVM block via the one interface coupling to a data bus and an address bus for allowing user logic in the programmable logic array to directly access memory locations in the NVM block in accordance with addresses on the address bus, the PC configured to initialize at least a portion of user data in the SRAM array retrieved from the NVM block after power to the PLD resumes.

2. The programmable logic device of claim 1, wherein at least a portion of the SRAM array is programmed to be initialized with the user data in the nonvolatile memory automatically after powered on.

3. The programmable logic device of claim 1, wherein the non-volatile memory is E2PROM, flash memory, FRAM or one-time programmable (OTP) memory.

4. The programmable logic device of claim 1, wherein the programming controller is configured to
receive external configuration data,
perform write operation to the non-volatile memory while programming,
perform write operation to the SRAM array while programming,
transfer the configuration data from the nonvolatile memory to the SRAM array after the programmable logic device is powered on, and
access the user data from the non-volatile memory by the user logic through the one interface.

5. The programmable logic device of claim 4, wherein the programmable logic array includes a logic interface which is one of Joint Test Action Group (JTAG), serial peripheral interface bus (SPI), inter-integrated circuit (I2C) and CPU bus interface.

6. The programmable logic device of claim 1, wherein the one NVM interface is a RAM interface of an asynchronous memory for facilitating read and write operations.

7. The programmable logic device of claim 1, wherein the PC includes interface a RAM interface of a synchronous memory or a RAM interface of a double data rate DDR memory for facilitating read and write operations.

8. The programmable logic device of claim 4, wherein the PC is configured to facilitate reading and writing operations on the non-volatile memory in response to reading and writing a RAM memory.

9. The programmable logic device of claim 8, wherein the interface connecting the programming controller and the logic interface of the user programmable logic array is a RAM interface of an asynchronous memory, a RAM interface of a synchronous memory or a RAM interface of a double data rate DDR memory.

10. A programmable semiconductor device able to be selectively programmed to perform one or more logic functions comprising:
a programmable logic array (PLA) containing a static random-access memory (SRAM), configurable logic block (LBs) and a logic interface, and operable to selectively perform user-defined logic functions;
a non-volatile memory (NVM) block fabricated adjacent to the PLA and configured to have a first segment of NVM block designated to store programming logic data, a second segment of NVM block designated to store user data, a third segment for storing product information, a fourth segment for storing encryption information, and a one NVM interface;
a programming controller (PC) disposed adjacent to the NVM block and configured to facilitate connects between the PLA and the NVM block via the logic interface and the one NVM interface for facilitating restoration of the user data from the NVM block to the SRAM upon resumption of power supply to the programmable semiconductor device, wherein the PC is configured to allow the PLA to randomly access memory locations in the NVM block based on addresses on an address bus via the one NVM interface.

11. The programmable semiconductor device of claim 10, wherein the SRAM is configured to store configuration information and user data wherein the configuration information and user data are configured to be retrievable from the NVM block.

12. The programmable semiconductor device of claim 10, wherein the logic interface is configured to receive information from the NVM block via the PC.

13. The programmable semiconductor device of claim 10, wherein the NVM block includes an information section, multiple programmable logic data sections and multiple user data sections, and multiple initializing data sections.

14. The programmable semiconductor device of claim 13, wherein the information section includes information relating to encryption.

15. The programmable semiconductor device of claim 14, wherein the information section includes information relating to product.

16. The programmable semiconductor device of claim 10, wherein the first segment of NVM block contains information to program the configurable LBs based on user selected logic functions.

17. The programmable semiconductor device of claim 10, wherein the second segment of NVM block stores data generated through operation of the PLA.

18. The programmable semiconductor device of claim 10, wherein the one NVM interface is configured to couple to a data bus, an address bus, and control signals.

19. The programmable semiconductor device of claim 10, wherein the PC is configured to facilitate to allow the PLA to access the NVM block for logic operation via the logic interface of the PLA and the one NVM interface.

20. The programmable semiconductor device of claim 19, wherein the PC is configured to facilitate to allow the PLA to restore programming data from the NVM block via the one NVM interface.

* * * * *